March 31, 1964   J. H. BORNZIN ETAL   3,126,894
SPECIFIC THRESHING CYLINDER MOUNTING MEANS
Filed Feb. 15, 1962   2 Sheets-Sheet 2
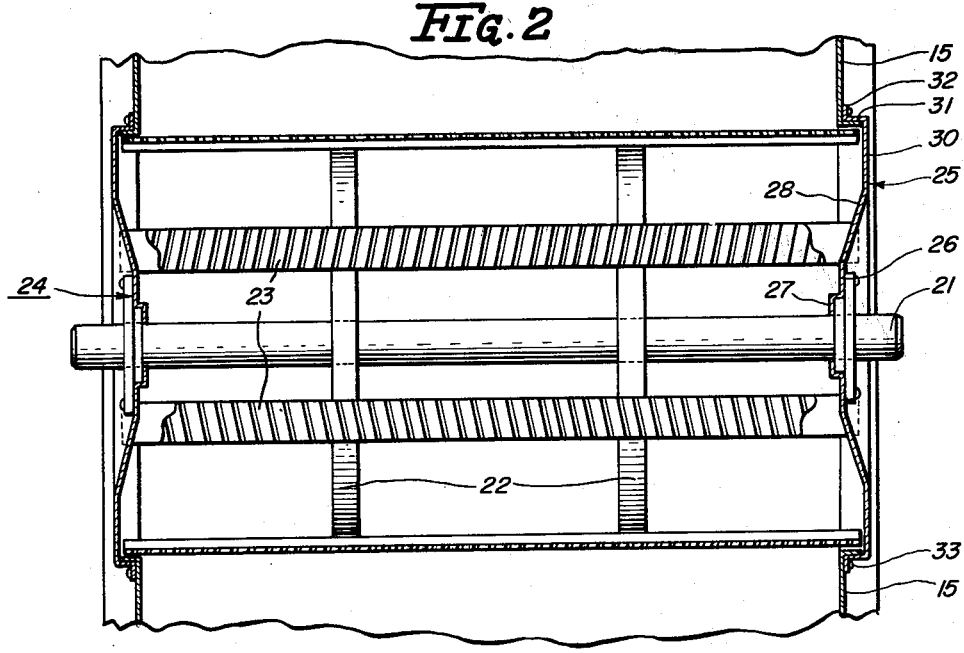
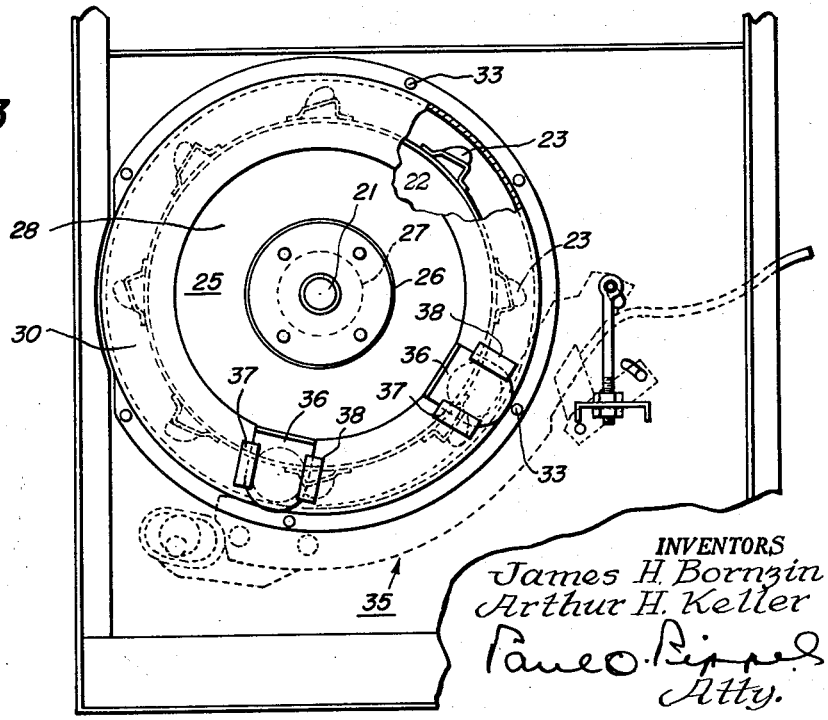
INVENTORS
James H. Bornzin
Arthur H. Keller
Atty.

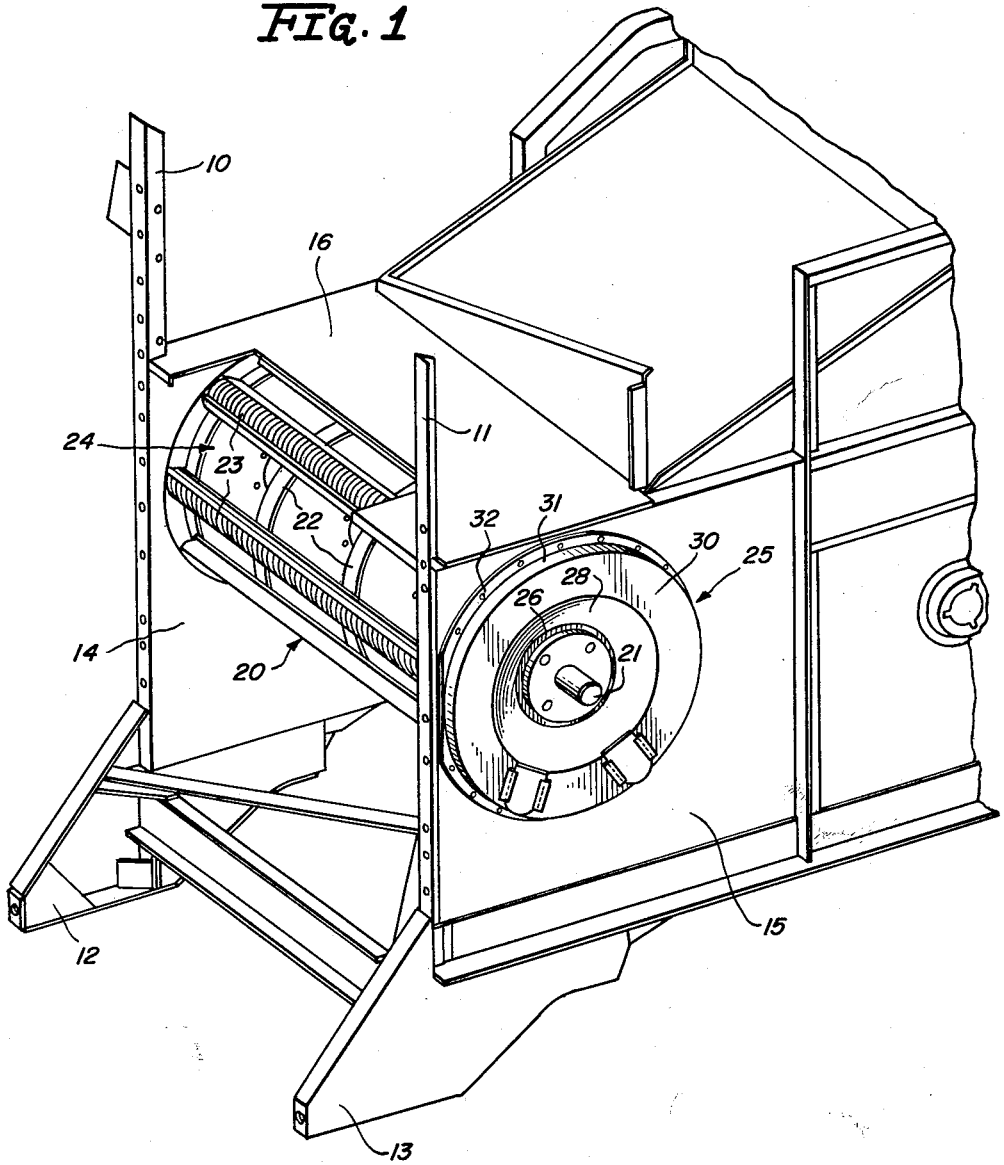

United States Patent Office 3,126,894
Patented Mar. 31, 1964

3,126,894
SPECIFIC THRESHING CYLINDER MOUNTING MEANS
James H. Bornzin, La Grange, and Arthur H. Keller, Western Springs, Ill., assignors to International Harvester Company, Chicago, Ill., a corporation of New Jersey
Filed Feb. 15, 1962, Ser. No. 173,434
2 Claims. (Cl. 130—27)

This invention is directed to an agricultural apparatus, and more particularly to a combine which includes structural improvements in the material flow path adjacent to the threshing cylinder.

A combine includes a series of mechanical components arranged to harvest and thresh as much crop material as possible with each single traversal of a field by the machine. The crop material enters at the front of a platform which cuts a comparatively wide swath, and the cut or harvested material is then gathered centrally for passage through a material flow path toward the rear of the combine. The threshing apparatus generally includes a threshing cylinder disposed across this material flow path to operate on the crop material fed therethrough. Thus the lateral extent of the cylinder, and likewise the amount of crop processing that can be done by the cylinder, is influenced by the distance between the spaced-apart wall portions which define the material flow path in the vicinity of the cylinder.

It is therefore a primary object of the present invention to provide a combine construction in which the effective lateral extent of the threshing cylinder unit is greater than the width of the spaced-apart wall portions leading to and from the threshing cylinder.

With the prior art constructions of cylinder-and-concave arrangements, it is noted that the crop material sometimes tangles or bunches around the ends of the cylinder threshing bars adjacent the wall portions of the material feeding channel. Another object of the invention, therefore, includes the provision of such an enlarged material threshing area which obviates the problem of tangling of the crop material with the threshing bar at the ends of the cylinder.

The foregoing and other objects are realized, in a preferred embodiment of the invention, by providing symmetrically-positioned apertures in each wall portion of the material feeding channel, each aperture being slightly greater in extent than the diameter of the cylinder. A pair of end closure members are provided, one member being inserted over each aperture. More specifically, each end closure member includes an outer portion which extends beyond the ends of the threshing bars of the cylinder assembly, and the outer portion tapers inwardly to a central portion recessed within the ends of the threshing bars to provide bearing support areas for the center shaft of the cylinder assembly. Affixed to the outer portion of each end closure member is a re-entrant flange section which overlaps an adjacent part of the wall portion in a shielding relationship. Thus, although a greater portion of the material feeding channel is not altered, such channel is effectively enlarged by the elongated threshing bars rotating adjacent to the end closure members.

The best mode contemplated for carrying out the invention will now be described. To enable those skilled in the art to make and to use the invention, such description is set forth in connection with the accompanying drawings, in the several figures of which like reference numerals identify like elements, and in which:

FIGURE 1 is a perspective illustration of a part of the material feeding channel in a combine modified in accordance with the inventive teaching;

FIGURE 2 is a partial front view, with portions in section, taken on a scale enlarged with respect to that of FIGURE 1, particularly illustrating the inventive structure; and FIGURE 3 is a side view, related to the showing of FIGURE 2, useful in explaining the invention.

*Structure of the Invention*

FIGURE 1 illustrates a portion of the main or central part of a combine, and depicts upright angle members 10 and 11 and a pair of support brackets 12 and 13 suitably apertured to provide for interconnection with the feeder housing (not shown), through which housing the harvested crop material is forwarded by suitable conveyor means. A segment of the material feeding channel is defined by wall portions 14 and 15, and an overhead or ceiling portion 16. The lowermost portion of the channel is in part defined by the concave, not visible in the showing in FIGURE 1.

The cylinder assembly 20 includes a center shaft 21, a plurality of cylinder heads 22 supported on shaft 21 at spaced-apart intervals, and a plurality of threshing bars 23 affixed to the outer portions of cylinder heads 22 as illustrated. As will be made clear in a subsequent explanation, the length of each threshing bar is greater than the lateral material feeding channel space defined between side walls 14 and 15.

In accordance with the present invention, each of side wall portions 14 and 15 is apertured to provide a substantially circular opening for receiving a pair of support-ing end members 24 and 25. Inasmuch as the end closure members are identical and are mounted symmetrically in the respective wall portions 14 and 15, only the structure and mounting of end closure member 25 in wall portion 15 will be described.

Referring to FIGURE 2, end member 25 comprises a central portion 26 recessed within the ends of cylinder assembly 20, considering the ends of the cylinder assembly coextensive with the ends of thresting bars 23. In this embodiment central portion 26 is substantially aligned with wall portion 15. Further, portion 26 is stamped or deformed to provide a bearing well 27, to receive a bearing (not illustrated) or similar mounting unit for supporting the right end of shaft 21 as viewed in FIGURE 2. Member 25 further comprises a tapered portion 28 which interconnects the central portion 26 and an outer or extended rim portion 30 disposed beyond the extremities of threshing bars 23. Member 25 further comprises a down-turned flange portion 31 affixed to the extremity of outer portion 30, for mating and shielding engagement with the contiguous portion of wall section 15. A fastening rim 32 is affixed to flange portion 31 and provided with a plurality of apertures for alignment with similar apertures in wall section 15, through which a plurality of fasteners such as rivets 33 are passed to secure end member 25 to wall section 15. Bolt arrangements, welding, or other suitable fastening means can be utilized if desired, provided only that a mechanically secure and integral housing is afforded with the mounting of the end closure member in place.

A side view of closure member 25 is set out in FIGURE 3, shown in its relation to concave assembly 35. Also shown are a pair of removable inserts 36, each indexed between a pair of tabs 37 and 38 so that removal of the members 36 provides access to, and a good view of, the outer cylinder assembly, the adjacent concave, and the space between the cylinder and the concave. That is, an inspection hole is provided under each of inserts 36, which holes are depicted by broken lines in FIGURE 3. Thus the inserts are easily removed, by sliding them upwardly, to view the cylinder-concave spacing. The inspection holes are an important feature of the invention, because without such holes, it would be extremely difficult to gauge the relative positions of the concave and the threshing cylinder. Accordingly the requisite changes in concave-cylinder spacing to accommodate variations in the type of crop material, in moisture level, etc., are rapidly and accurately made as the result of each adjustment is visible through the inspection holes.

*Operation of the Invention*

As the cylinder assembly is driven by means not illustrated but well known and understood in the art, crop material is passed between the cylinder assembly and the adjacent portions of the concave to effect the threshing operation. By utilizing the novel end closure members of the invention, in which the outer portions of members 24 and 25 are spaced outwardly beyond the combine side walls to accommodate the ends of the extended threshing bars, the effective threshing dimension of the cylinder assembly is significantly increased. Although this increase can be attained without altering the positions of the support bearings with respect to the combine side walls, the bearings need not be positioned in alignment with the side walls as shown in the drawings. If desired, the bearings can be moved closer together, or can even be moved farther apart to positions beyond the combine side walls.

In addition, the structure of the invention obviates the tangling up of stems at the end of the threshing bars in the space between such bars and the adjacent wall portions of the combine. Rotation of the cylinder assembly provides a blowing effect at the extremities of the threshing bars, assisting in the provision of an even threshing operation across the entire extent of the cylinder assembly. Further, there is some fan effect provided by the extended threshing bars, which effect assists in the rearward movement of the straw and chaff after the threshing.

A further advantage realized with the inventive structure is that a significant increase in strength of the side walls is obtained in the cylinder mounting area. The strength is produced by the wells, flanges, etc., formed in the end closure panels. By thus strengthening the end closure panels, the cylinder mounting area is much stronger than those of prior machines, thereby to prevent "breathing" or material expansion which allows material crowding at the ends of the cylinders.

While only a particular embodiment of the invention has been disclosed and illustrated, it is apparent that modifications and alterations may be made therein. It is the intention, therefore, in the appended claims to cover all such modifications and alterations as may fall within the true spirit and scope of the invention.

What is claimed is:

1. For use with a threshing cylinder comprising a center shaft and threshing bars defining a hollow interior, a mounting comprising: a pair of end closure members, each member having a central portion recessed within an end of said thresting cylinder, an intermediate portion affixed to and tapering outwardly from said central portion, an outer portion extending beyond the end of said cylinder, and a re-entrant flange portion overlapping said end of the cylinder in shielding relation thereto and spaced radially therefrom.

2. For use with a combine having a material flow path defined between a pair of apertured wall portions spaced apart by a given distance and disposed substantially parallel to each other, and having a cylindrical threshing assembly extending across said path between said wall portions, said assembly including a center shaft and a plurality of bar members each supported at a predetermined radial distance from said center shaft and being of a length in excess of said given distance, the improvement comprising:

a pair of circular closure members positioned in the apertures formed in said wall portions to provide a bar passage area disposed substantially outwardly with respect to said wall portions; each member having a central portion for supporting said central shaft of the threshing cylinder, an outer portion adapted to extend beyond the outer periphery of said cylinder, and an annular re-entrant flange portion overlapping said end of the cylinder in shielding relation thereto and spaced radially therefrom, the outwardly disposed bar passage areas of said circular closure members providing a widened material flow path in the area of said bars.

References Cited in the file of this patent

UNITED STATES PATENTS

| | | |
|---|---|---|
| 447,032 | Landis | Feb. 24, 1891 |
| 549,264 | Ball | Nov. 5, 1895 |
| 2,579,326 | Lang | Dec. 18, 1951 |
| 2,833,288 | Scranton | May 6, 1958 |
| 2,962,028 | Kahle | Nov. 29, 1960 |